UNITED STATES PATENT OFFICE.

RALPH S. POTTER, OF GRANTWOOD, NEW JERSEY, ASSIGNOR TO THE BARRETT COMPANY, A CORPORATION OF NEW JERSEY.

PROCESS OF PRODUCING ANTHRANILIC ACID.

1,322,052.  Specification of Letters Patent.  Patented Nov. 18, 1919.

No Drawing.  Application filed June 17, 1919. Serial No. 304,834.

*To all whom it may concern:*

Be it known that I, RALPH S. POTTER, a citizen of the United States, residing at Grantwood, in the county of Bergen and State of New Jersey, have invented certain new and useful Improvements in Processes of Producing Anthranilic Acid, of which the following is a specification.

This invention relates to a process of producing anthranilic acid and has for its object to produce the acid in such a manner that a minimum loss of this valuable material results, while, at the same time, cheapening the cost and regaining valuable by-products of the process. This invention is applicable to the recovery of anthranilic acid from anthranilates in solution in general where a soluble carbonate is also present, but will be specifically described in its application to the recovery of anthranilic acid from its sodium salt in solution in the presence of sodium carbonate.

The sodium salt of anthranilic acid is ordinarily made by treating phthalimid with sodium hypochlorite and sodium hydroxid in accordance with the following equation.

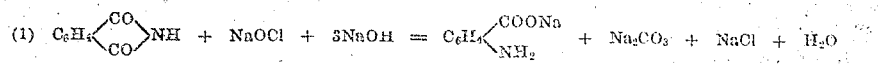

According to the ordinary manufacturing practice the raw materials used are in the approximate proportion of their molecular weights, that is, about 147 parts of phthalimid to 74 parts of sodium hypochlorite to 120 parts of sodium hydroxid. A solution of sodium hypochlorite is added to a mixture of sodium hydroxid and phthalimid in the proportions indicated and after the reaction has been completed there is left in the reaction mixture the sodium salt of anthranilic acid, sodium carbonate and sodium chlorid. All these materials are in solution, and when it is attempted to precipitate the anthranilic acid by the addition of hydrochloric or sulfuric acid difficulty is experienced in determining the correct amount of the mineral acid to be added because if insufficient hydrochloric or sulfuric acid is added some of the anthranilic acid will not be precipitated, and if too much is added some of the anthranilic acid will be dissolved in the excess acid.

For example, if three molecular weights of HCl to one molecular weight of the sodium salt of anthranilic acid is used the following reaction will take place, (the NaCl takes no part in the reaction.)

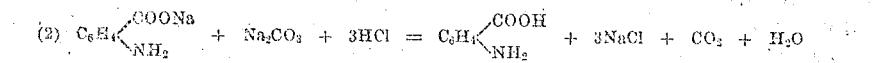

Since anthranilic acid is quite insoluble it would be precipitated in practically quantitative amounts by adding the exactly correct amount of hydrochloric acid.

If, however, more than the proper amount of HCl is added the hydrochlorid of anthranilic acid, which is fairly soluble in water, will be formed in accordance with this equation.

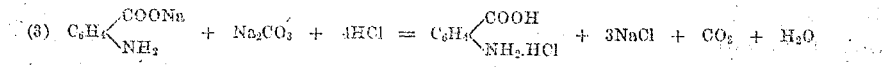

Similar results are obtained by the use of sulfuric acid. In actual practice it has been found exceedingly difficult to use the correct amount of acid, thereby causing a loss of some of the anthranilic acid, which is either left in solution as the sodium salt due to the use of insufficient hydrochloric or sulfuric acid or is dissolved as the hydrochlorid or sulfate due to the use of too much hydrochloric or sulfuric acid. The reason it is difficult to add exactly the right amount of hydrochloric or sulfuric acid is that various yields are obtained in accordance with equation (1) at various times due probably to the degree of purity of the compounds used, or to side reactions which may take place.

Moreover it is evident from equation (1) that a large amount of the caustic soda necessary for producing the reaction appears in the resultant mixed products as sodium carbonate and that if this is acidified by hydrochloric or sulfuric acids that this valuable sodium is transformed into a waste valueless product such as sodium chlorid or sulfate as represented by equation (2).

I have therefore found the following cycle of operations to be workable, and that when so carried out, anthranilic acid may be produced in a more economical manner than heretofore done.

I prefer to treat the products of reaction (1) with carbon dioxid, thereby converting the sodium carbonate into bicarbonate which is relatively insoluble due to the presence of other soluble sodium ions whereby it may be filtered off and regained. By this method at least 50% of the sodium present as sodium carbonate may be regained as bicarbonate, converted into sodium carbonate by heating and later transformed into sodium hypochlorite in sufficient amount to oxidize the next batch of phthalimid.

I next acidify the filtrate from the sodium bicarbonate, which contains the sodium salt of anthranilic acid, with gaseous sulfur dioxid. The objections and disadvantages above noted are obviated by using sulfur dioxid to precipitate the anthranilic acid, instead of using hydrochloric or sulfuric acid, in accordance with the following equation.

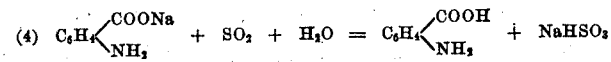

The $SO_2$ is only slightly soluble in water and it is too weak an acid to form a sulfite salt with anthranilic acid. Therefore, after the reaction mixture, resulting from the treatment indicated in equation (1), has been treated with carbon dioxid and filtered, the filtrate may with impunity be treated with sufficient $SO_2$ to assure the precipitation of all of the anthranilic acid because there is no danger of using so much $SO_2$ that some anthranilic acid will be lost.

It is thus clear that the use of $SO_2$ for precipitating anthranilic acid possesses the following advantages over the use of hydrochloric or sulfuric acid: Higher yields may be obtained; there is no danger of adding an excess; by passing in the $SO_2$ until there is a distinct odor of $SO_2$ from the reaction mixture a sufficient amount is assured; less care is required to add the proper amount of acid; and an iron reaction vessel and an iron centrifugal drier may be used in practising the invention.

And moreover by my process a very substantial amount of valuable sodium salts are saved by the use of $CO_2$ and are returned to the process as sodium hypochlorite as above described.

While this invention has been specifically described in connection with the separation of anthranilic acid from the reaction mixture resulting from the treatment of phthalimid with sodium hypochlorite and sodium hydroxid, it is obvious that it is applicable to the reaction mixture produced when potassium is used instead of sodium and hypobromite is used instead of hypochlorite, and the claims are intended to cover this.

Having now described my invention what I claim and desire to protect by Letters Patent is:—

1. The herein described process which comprises passing carbon dioxid into a solution containing an alkali salt of anthranilic acid and an alkali carbonate, to convert most of the carbonate into bicarbonate, filtering off the precipitated bicarbonate and passing an excess of sulfur dioxid into the filtrate.

2. The herein described process which comprises passing carbon dioxid into a solution containing an alkali salt of anthranilic acid and an alkali carbonate, to convert most of the carbonate into bicarbonate, filtering off the precipitated bicarbonate and passing sulfur dioxid into the filtrate in sufficient amount to precipitate substantially all of the anthranilic acid.

3. The herein described process which comprises passing carbon dioxid into a solution containing the sodium salt of anthranilic acid and sodium carbonate, to convert most of the sodium carbonate into sodium bicarbonate, filtering off the precipitated sodium bicarbonate and passing an excess of sulfur dioxid into the filtrate.

4. The herein described process which comprises passing carbon dioxid into a solution containing the sodium salt of anthranilic acid and sodium carbonate, to convert most of the sodium carbonate into sodium bicarbonate, filtering off the precipitated sodium bicarbonate and passing sulfur dioxid into the filtrate in sufficient amount to precipitate substantially all of the anthranilic acid.

In testimony whereof I affix my signature.

RALPH S. POTTER.